No. 732,209. PATENTED JUNE 30, 1903.
J. P. MUEHLEBACH.
HOSE COUPLING.
APPLICATION FILED APR. 13, 1903.
NO MODEL.
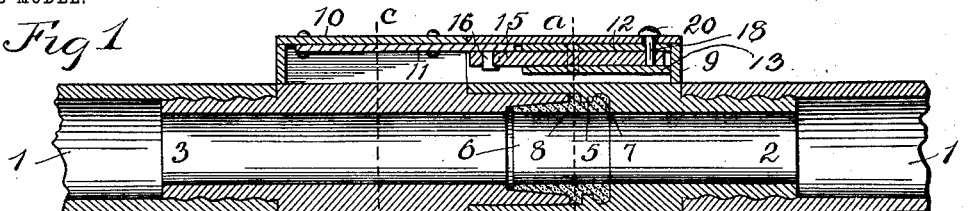
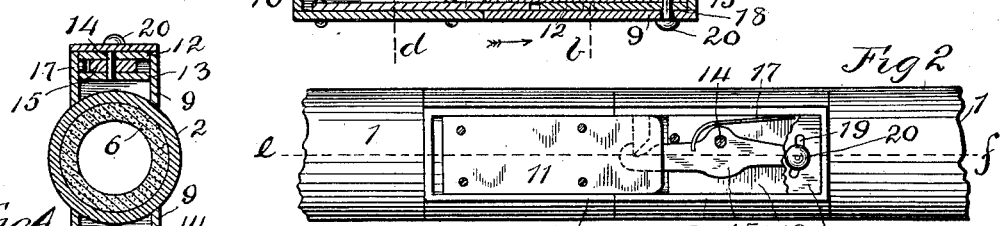
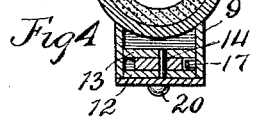
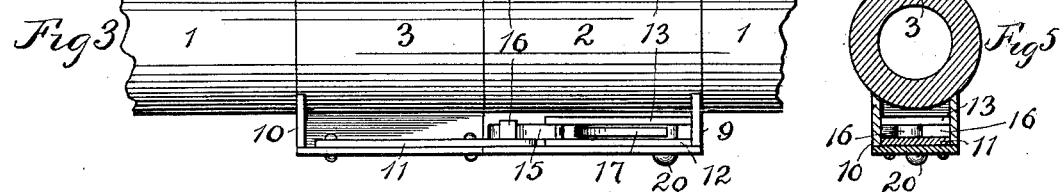
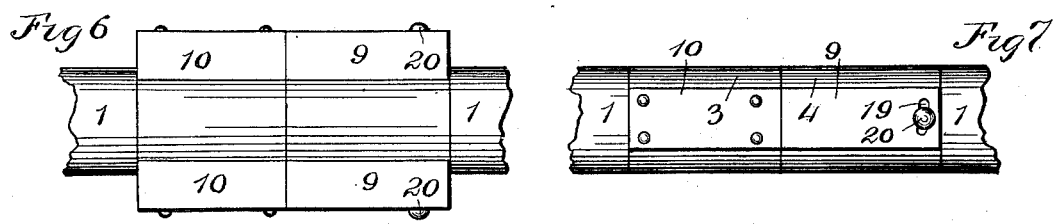
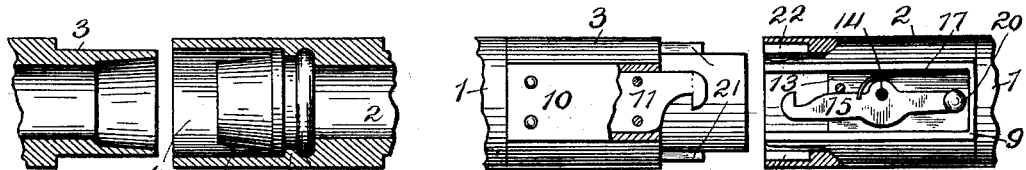
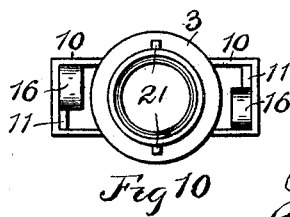
Witnesses:
R. E. Hamilton.
W. L. Crawford.
Inventor
John P. Muehlebach
By Warren D. House,
His Attorney.
THE NORRIS PETERS CO., PHOTO-LITHO., WASHINGTON, D. C.

No. 732,209. Patented June 30, 1903.

UNITED STATES PATENT OFFICE.

JOHN P. MUEHLEBACH, OF KANSAS CITY, MISSOURI.

HOSE-COUPLING.

SPECIFICATION forming part of Letters Patent No. 732,209, dated June 30, 1903.

Application filed April 13, 1903. Serial No. 152,415. (No model.)

*To all whom it may concern:*

Be it known that I, JOHN P. MUEHLEBACH, a citizen of the United States, residing in Kansas City, in the county of Jackson and State of Missouri, have invented a certain new and useful Improvement in Hose-Couplings, of which the following is a specification, reference being had therein to the accompanying drawings, forming a part thereof.

My invention relates to improvements in hose-couplings.

The object of my invention is to provide a hose-coupling in which the joint between the two members is tightly sealed.

My invention has for its further object the providing of a hose-coupling in which the two members may be quickly and firmly locked together and as readily disconnected. My invention provides on each member a protecting casing or casings in which the locking mechanism or mechanisms are shielded from injury.

Other novel features of construction are hereinafter fully described and claimed.

In the accompanying drawings, which illustrate my invention, Figure 1 is a longitudinal sectional view of two members locked together. Fig. 2 is a top view of the same with the top plate of the near casings removed and a portion of one of the transverse plates in one of the casings broken away. Fig. 3 is a side elevation view of what is shown in Figs. 1 and 2, the near side plates of the casings being removed to disclose the interior of the casings. Fig. 4 is a cross-section taken on the dotted line *a b* of Fig. 1 looking in the direction indicated by the arrow. Fig. 5 is a similar view taken on the dotted line *c d* of Fig. 1. Fig. 6 is a side elevation view complete, showing the two members united. Fig. 7 is a top view of the same. Fig. 8 is a longitudinal sectional view of portions of the two members detached, the resilient thimble being shown in elevation in one of the members. Fig. 9 is a top view of a modification of my invention in which the guides comprise tongues on one member and grooves in the other member. In this view parts are removed and some parts broken away and others shown in horizontal section, the two members being shown detached. Fig. 10 is an end elevation view of the member shown on the left in Fig. 9.

Similar characters of reference indicate similar parts.

1 indicates the hose.

2 and 3 indicate the two members, each adapted to be secured to a section of hose at one end and the two members being adapted to slip one over the other at their free ends. The member 2 is provided with a recess 4 at one end, to which is fitted the reduced end of the member 3. The member 2 is provided with an inner annular flange 5, disposed at the inner end of the recess 4. In the member 2 is mounted a tubular open-ended resilient thimble 6, provided at one end with two annular peripheral flanges 7 and 8, between which the inner flange 5 is tightly fitted, thus retaining the thimble 6 in place. The outer end of the thimble is tapering or conoidal in form and is adapted to enter and snugly fit the flaring outer end of the member 3. The end of the member 3 presses the flange 8 tightly against the flange 5 when the members are united, as shown in Fig. 1. The joint between the members is thus tightly sealed, the pressure of the water in the members 2 and 3 serving to further thoroughly seal the joint.

Disposed diametrically opposite on the member 2 are mounted two rectangular casings 9, the outer ends of which are open and are adapted to abut against and register with two similar casings 10, similarly mounted upon the member 3. Upon the upper inner side of each casing 10 is secured a plate 11, the outer end of which is adapted to enter and fit between the side walls of the opposite casing and serving as guides to properly locate the two members relative to each other when they are slipped together. In each casing 9 are provided two transverse plates 12 and 13. Between each of said pair of plates is pivoted by a pin 14, extending through the plates, a longitudinally-disposed laterally-movable lever 15, the outer end of which is hooked in form and adapted to engage an inwardly-extending hook or projection 16, mounted one on each plate 11. Between each pair of plates 12 and 13 and bearing upon the casing 9 and connected to the lever 15 is a flat spring 17, the tension of which normally forces the hooked end of the lever 15 to engage the adjacent projection 16. The other end of each lever 15 is provided with an operating-arm 18, which extends through slots 19, provided in the plate 12 and the top of each casing 9. The outer end of the said arm 18 may be provided with a button 20, by which the lever may be swung.

In the form of my invention shown in Figs. 9 and 10 the parts are constructed as above described, excepting that instead of the plates 11 being formed to serve as longitudinal guides for the members the reduced end of the member 3 is provided with diametrically oppositely disposed longitudinal tongues 21, adapted to enter and fit corresponding recesses 22, provided in the recessed end of the member 2.

In operating my invention, the parts having been constructed and assembed as described, it is but necessary to slip member 3 into the recessed end of member 2, with the outwardly-extending ends of plates 11 inserted in the casings 9. By forcing the members together the levers 15 will be forced past the projections 16 against the pressure of springs 17 and will then engage the said projections, as shown in Fig. 2 in dotted lines. When the levers are so engaged, the casings 9 and 10 will be forced against each other and the flange 8 will be tightly compressed against the flange 5 of the member 2 by the end of the member 3. To detach the members, it is but necessary to force the buttons 20 in a direction such that the hooked ends of levers 15 will be freed from the projections 16, at which time the members may be drawn lengthwise apart. The plates 11, entering the casings 9 in one form of my invention, and the tongues 21, entering the recesses 22 in the other form of my invention, prevent turning relatively of the members and relieve the levers 15 from any lateral strain. When united, the connecting parts of the members are fully covered and protected, and the hose may be used roughly and drawn over obstructions without injury to any of the parts.

My invention may be variously modified without departing from its spirit.

Having thus described my invention, what I claim, and desire to secure by Letters Patent, is—

1. In a hose-coupling the combination with two tubular members adapted to be secured each to a section of hose, the end of one member being reduced to fit into a recess provided in the adjacent end of the other member, the recessed member being provided with an inner annular flange, of a resilient tubular sealing member having two annular peripheral flanges between which the inner annular flange of the recessed member is fitted, the adjacent end of the other member being adapted to encircle the outer end of said sealing member and press the outer flange thereon against the flange of the recessed member, and detachable means for locking the two outer members together.

2. In a hose-coupling, the combination with two tubular members adapted to be secured each to a section of hose, the end of one member being reduced to fit into a recess provided in the adjacent end of the other member, the recessed member being provided with an inner annular flange, of a resilient thimble having two annular peripheral flanges between which the inner annular flange of the recessed member is fitted, the outer end of the thimble having a conical shape and adapted to be fitted into the adjacent end of the reduced member, and means for detachably locking the two members together.

3. In a hose-coupling, the combination with two tubular members adapted to be secured each to a section of hose, the end of one member being reduced to fit into a recess provided in the adjacent end of the other member, the recessed member being provided with an inner annular flange, of a resilient tubular thimble having two annular peripheral flanges between which is fitted the inner annular flange of the recessed member, the outer end of the said thimble being adapted to be inserted into the reduced end of the other member the outer end of which presses the outer flange on the thimble against the annular inner flange on the recessed member, and means for detachably locking the two members together.

4. In a hose-coupling, the combination with two tubular members adapted to be secured each to a section of hose, adjacent ends of the members being adapted to be fitted one into the other, one of the members being provided with an annular inner flange, of a resilient thimble having two annular peripheral flanges between which is fitted the said inner flange of one member, the thimble having its outer end fitted in the outwardly-flaring end of the other member, and the outer of the flanges of the thimble being adapted to be compressed between the two members, and detachable means for locking the two members together.

5. In a hose-coupling, the combination with two tubular members adapted to be secured each to a section of hose, the adjacent ends of said members being fitted to slip one into the other, one of the members being provided with an inner annular flange, of a resilient thimble provided with two annular peripheral flanges between which is fitted the said inner flange of one member, the outer end of the thimble being tapering in form and adapted to fit into the adjacent end of the other member the end of which presses the outer of the thimble-flanges against the said inner flange of the opposite member, a lever pivoted upon one member, a lug upon the opposite member adapted to be engaged and held by the said lever, a spring normally holding the lever and projection engaged, and longitudinal guiding means for properly locating the two members one upon the other.

6. In a hose-coupling, the combination with two tubular members adapted to be inserted one in the other, of a sealing device for closing the joint between the two members, a casing mounted upon one member, a lever pivotally mounted therein and provided with an operating-arm extending through a slot provided in the casing, a spring in the casing for forcing the lever in one direction, a casing upon the other member, a plate therein provided with a projection adapted to be engaged by the said lever, and guiding means for properly locating the two members so that the lever may engage the said projection when the members are slipped together.

7. In a hose-coupling, the combination with two tubular members adapted to be inserted one in the other, of a sealing device for closing the joint between the two members, four casings disposed two upon each member in diametrically opposite positions, the adjacent ends of casings upon opposite members coming together when the members are united, a lever pivotally mounted in each [casing of one member, each lever having an operating-arm projecting through an opening provided therefor in the casing, two plates provided one in each casing of the other member, each plate being provided with a projection adapted to be engaged by the lever adjacent thereto, two springs mounted one on each casing which is provided with a lever, the said springs forcing the levers normally to engage with the said projections respectively when the members are united, and means for guiding the members so that the said levers may engage the said projections when the members are slipped together.

8. In a hose-coupling, the combination with two tubular members adapted to be inserted one in the other, of means for sealing the joint between them, two casings, one upon each member, means by which the members may be slipped together so that the said casings may be in proper register at abutting ends, a lever pivotally mounted in one casing and provided with an arm at one end extending through an opening provided therefor in the said casing, and having a hook at the other end, a plate secured in the opposite casing provided with a projection adapted to be engaged by the said hook, and a spring in one casing for forcing the lever into engagement with the said projection.

9. In a hose-coupling the combination with two tubular members adapted to be inserted one in the other, of four casings mounted two upon each member, the casings on each member being disposed diametrically opposite each other, and casings of one member fitting against and registering with the casings upon the other member when the members are slipped together, two plates secured one in each casing on one member and adapted each to enter and fit between the opposite sides of the adjacent casing upon the opposite member, each of said plates being provided with a hook, two levers mounted pivotally one in each of the casings upon the opposite member, each lever being provided with a hook at one end adapted to engage the hook of the adjacent plate when the members are slipped together, the other end of each lever being provided with an operating-arm extending through an opening provided therefor in its casing, and two springs mounted one in each casing in which is mounted a lever, the springs forcing the said levers respectively into engagement with the said hooks on the said plates.

10. In a hose-coupling, the combination with two tubular members adapted to be inserted one in the other, of four casings mounted two upon each member, the casings being disposed diametrically opposite and provided with open abutting ends adapted to register with the adjacent casings of the opposite members, two plates secured one in each casing of one member and adapted to enter and fit between opposite walls of the adjacent casing on the opposite member, each of said plates being provided with a hooked portion, four transverse plates secured lengthwise in each of the casings of the member opposite the one having the said plates, two levers mounted one between the two transverse plates of each of the casings provided with the same, each lever having at one end an arm projecting through an opening provided therefor in the upper transverse plate, the other end of the lever being provided with a hook adapted, when the members are slipped together, to engage the hooked portion of the plate in the opposite casing, and two springs mounted one between each pair of transverse plates and normally forcing the lever between said pair of plates to engage with the hooked portion of the opposite plate.

11. In a hose-coupling, the combination with two tubular members the adjacent ends of which are adapted to be slipped one into the other, one of the members being provided with an inner annular flange, of a resilient tubular thimble provided with two annular peripheral flanges between which is fitted the said inner flange, the outer end of the thimble being tapering in form and fitted to enter the adjacent end of the other member, the end of which presses the outer of said peripheral flanges against the said inner annular flange, when the members are slipped together, two casings, mounted upon one member and disposed diametrically opposite each other, two casings mounted upon the other member and similarly disposed, two plates mounted in the two casings respectively on one member and adapted to enter and fit between the sides of the opposite casings respectively of the other member, two levers mounted pivotally one in each of the casings respectively which are disposed opposite the casings having the said plates, the said levers being provided with means for detachably engaging the said plates respectively when the members are united, means by which the levers may be swung so as to be freed from said plates, and two springs bearing one upon each of said levers for normally holding the levers and plates engaged.

In testimony whereof I have signed my name to this specification in the presence of two subscribing witnesses.

JOHN P. MUEHLEBACH.

Witnesses:
F. J. MILICH,
HENRY F. ROSE.